Patented Feb. 7, 1950

2,496,934

UNITED STATES PATENT OFFICE 2,496,934

ADHESIVE

Clarence M. Carson, Cuyahoga Falls, Ohio, assignor to Wingfoot Corporation, Akron, Ohio, a corporation of Delaware No Drawing. Application October 26, 1945, Serial No. 624,939

2 Claims. (Cl. 260—752)

This invention relates to a nondrying adhesive and, more particularly, to a sheet coated with the same and laminated products produced therewith. Essentially, the adhesive contains a resinous material and a sticky, stretchable polyester produced by the reaction of a dihydric alcohol with a dimer formed from linoleic acid or other fatty acid which contains two or more double bonds, such as linoleic, arachidic, clupanodonic, etc., acid. The adhesive may contain modifiers, fillers, solvent, etc. This application is in part a continuation of my application Serial No. 467,253, filed November 28, 1942, now abandoned.

In an article by Bradley and Johnston entitled "Drying oils and resins" beginning with page 86 in Industrial and Engineering Chemistry for January, 1941 (volume 33), the preparation of esters from polyhydric alcohols and such dimers or trimers is described. The dimers or trimers retain their carboxylic acid groups. The condensation with the alcohol produces a polyester, preferably by condensing but one of the hydroxyl groups of the alcohol with a carboxylic acid group of the dimer or trimer. In the esterification the alcohol and the acid dimer or trimer are preferably employed in approximately equivalent amounts. In the production of the esters for use in this invention, dihydric alcohols are condensed with acid dimers to produce long-chain molecules which form better adhesives than the reaction products with polyhydric alcohols or acid trimers which tend to produce cross linkages and form resins. The esters of this invention are, therefore, produced from dihydric alcohols and acid dimers which, of course, may contain some acid trimer as impurity although any large amount of the trimer is objectionable.

The polyester used in carrying out this invention is a sticky, stretchable material, preferably intermediate between a gel and a heavy liquid, which can be stretched to great length without breaking. After stretching, it contracts slowly to its original size. It is soluble in petroleum hydrocarbons and aromatics but insoluble in acetone, ethyl alcohol, and chlorinated solvents. The preferred adhesive is transparent, and when used on rubber hydrochloride film, an adhesive of approximately the same index of refraction as rubber hydrochloride is preferably employed. The polyester formed from one molecule of ethylene glycol and one molecule of linoleic acid dimer is preferred for this use. The resins mentioned in the examples have substantially the same index of refraction as this polyester, and mixtures of the polyester and such resins make preferred adhesives for rubber hydrochloride film. Other dihydric alcohols that may be used in producing the polyesters of this invention include diethylene glycol and polymethylene glycols.

The adhesive of this invention is formed by mixing the sticky, stretchable polyester with a resinous material (natural or synthetic) which is compatible with the ester and gives it strength, increasing both its cohesion and its adhesion to other materials. The amount of resin used will vary. Usually, the amount of ester used will be between 30 and 50 parts to between 70 and 50 parts of resin. Occasionally, as in Example 2 (below) more ester than resin will be used to give a soft, stringy adhesive. More generally, the amount of ester used will be between about 30 to 75 parts with about 70 to 25 parts of the resin. The adhesive may contain modifiers in addition to the resins, such, for example, as zinc oxide, which may be compounded with it to obtain better adhesion to paper and the like.

The viscosity of solutions of the adhesive is quite low; so an extremely thin coating can be applied rapidly by a conventional laminating machine. The adhesives previously employed have generally been stiff or hard in an unplasticized condition. They have required plasticizer to make them flexible. Such plasticizers usually reduce the resistance of the adhesive layer to the transmission of moisture vapor. In many laminated products this is objectionable. The adhesive of this invention does not harden even though no plasticizer is added, and it always remains highly flexible. When used for the lamination of two or more flexible plies, it produces a flexible product.

The adhesive produced from transparent resins has a high degree of transparency and may be used in amounts up to 10 pounds per ream (or 16 grams per square meter) without appreciably decreasing the transparency of a transparent sheet to which it is applied.

The acids from which the dimers used in carrying out this invention are obtained are present as glycerides in animal and vegetable oils, such as soybean oil, dehydroxylated castor oil, corn oil, cottonseed oil, linseed oil, fish oil, flaxseed oil, etc. In producing the polyesters, the glycerides are converted to esters, such as the methyl esters, which are then polymerized to the dimer with anthraquinone or the like. The ester dimer may then be converted to the acid and finally esterified with the dihydric alcohol—all as described in the article by Bradley and Johnston, supra.

In the following examples the polyester referred to is the ethylene glycol dimer produced by the Archer-Daniels-Midland Company, of Midland, Michigan, and sold under the trade name Glycol Polyester. Other chemical companies are producing like esters entirely suitable for carrying out this invention. The polyester referred to in the examples is soluble in gasoline, petroleum ether, and aromatic solvents, such as toluol. The following examples illustrate the adhesives of this invention:

*Example 1*

|  | Per cent |
|---|---|
| Polyester | 27.2 |
| Hydrogenated rosin | 42.5 |
| Textile spirits | 30.3 |
|  | 100.0 |

The hydrogenated rosin of the examples is a product of the Hercules Powder Company sold under the name of Staybelite Resin. Textile spirits is a gasoline fraction distilling between 63° to 98° C.

*Example 2*

|  | Per cent |
|---|---|
| Polyester | 39 |
| Hydrogenated rosin | 17 |
| Textile spirits | 44 |
|  | 100 |

This adhesive is quite soft and stringy and lacks strength on rubber hydrochloride film although it may be quite satisfactory on a more porous base.

*Example 3*

|  | Per cent |
|---|---|
| Polyester | 26 |
| Hydrogenated rosin | 46 |
| Textile spirits | 28 |
|  | 100 |

This adhesive is slightly brittle as compared to Example 1. A range of properties can be obtained by varying the proportions of polyester and hydrogenated rosin between the ratios of 1:1 and 1:2. These are not definite limits but are satisfactory on many types of film.

Other resins may be used, as follows:

*Example 4*

|  | Per cent |
|---|---|
| Polyester | 25 |
| Cumar R3 | 25 |
| Textile spirits | 50 |
|  | 100 |

*Example 5*

|  | Per cent |
|---|---|
| Polyester | 35 |
| Ester gum | 40 |
| Textile spirits | 25 |
|  | 100 |

A preferred ester gum for use in this formula is the glycerin ester of hydrogenated rosin sold by Hercules Powder Company under the name Staybelite Ester No. 10. Adhesion to paper is increased by adding about 10 parts of zinc oxide in any suitable manner, as on a paint mill.

*Example 6*

|  | Per cent |
|---|---|
| Polyester | 25 |
| Piccolyte S100 | 50 |
| Textile spirts | 25 |
|  | 100 |

Piccolyte is a polymerized terpene, a product of the Pennsylvania Industrial Chemical Company.

*Example 7*

|  | Per cent |
|---|---|
| Polyester | 35 |
| Nypene | 35 |
| Toluol | 30 |
|  | 100 |

Nypene is a terpene product manufactured by the Neville Company.

*Example 8*

|  | Per cent |
|---|---|
| Polyester | 35 |
| Balata resin | 35 |
| Textile spirits | 30 |
|  | 100 |

Balata resin is a soft, waxy material obtained by extraction of balata gum.

*Example 9*

|  | Per cent |
|---|---|
| Polyester | 35 |
| Rosin | 30 |
| Toluol | 35 |
|  | 100 |

*Example 10*

|  | Per cent |
|---|---|
| Polyester | 20 |
| Rubber derivative (Pliolite, Parlon, Marbon | 20 |
| Toluol | 60 |
|  | 100 |

Of the rubber derivatives mentioned, Pliolite and Marbon are cyclized rubbers, and Parlon is a chlorinated rubber.

The proportions of the ingredients employed may be varied. More or less of the ester and more or less of the resinous material may be used. Other resinous materials which may be employed include the natural resins, such as dammar, copal, kauri, and Manila, etc.; phenolformaldehyde resins including modified phenolformaldehyde resins, e. g., Amberol M82; rosin-maleic acid condensate, e. g., Amberol 801; alkyd resins, e. g., Duraplex resins; acrylic acid resins, e. g., Acryloid, etc.; chlorinated diphenyls, e. g., Aroclor 1269; petroleum resins, e. g., those sold by Velsicol Corporation; resinous rubber derivatives, such as the chlorinated rubber produced by Hercules Powder Company and sold under the name of Parlon; or cyclized rubber, such as Pliolite sold by The Goodyear Tire & Rubber Company, or poly-cyclo-rubber, such as that produced by Marbon Corporation and sold as Marbon; and other resinous materials, natural or synthetic.

The method of mixing the resins with the polyesters may vary. One method is to stir the polyester into a solvent with one or more resinous materials until solution is obtained. According to another method the polyester is melted to a liquid condition and the resin added slowly with stirring until a homogeneous fluid is obtained. The mixture may then be cooled, and the solid obtained may be dissolved in an appropriate solvent. As a further alternative, the resin may be melted, the polyester added, the mixture cooled, and then dissolved.

According to still another method, the resin and polyester are heated together to 200-300° C. until a viscous, sticky product is obtained. On cooling, the mixture is dissolved in any appropriate solvent.

The adhesive produced by these various formulae is nondrying. In laminating two transparent sheets, it is best to use a solution of the adhesive in a solvent which will not attack or dissolve the sheet material as this may cause the sheet to wrinkle. For example, in laminating rubber hydrochloride film, gasoline is a preferred solvent. The adhesive of Example 1 is satisfactory for this purpose. For cellophane (regenerated cellulose) toluol may be used entirely or in part. For coated cellophanes, a small amount of ethyl acetate is advantageously added to the toluol, or a mixture of gasoline and ethyl acetate may be used. Gasoline has been found satisfactory on rubber hydrochloride, all types of cellophane which were tested, cellulose acetate, nylon, ethyl cellulose, polyvinyl alcohol, and all types of Vinylite, including polyvinyl chloride, polyvinyl chloride-vinylidene chloride, polyvinyl acetate, cellulose acetobutyrate, and mixtures of any two of the Vinylites, etc.

It is not only possible to laminate two sheets of like film including those mentioned; but two films of different types as, for instance, rubber hydrochloride and cellophane may be laminated using, for example, the adhesive of Example 10. The adhesives of this invention, being permanently tacky, will adhere to both these surfaces and form a satisfactory lamination. They form a strong bond with fabrics; metal foils, including aluminum, lead, copper, tin, etc.; papers, including moistureproof glassine and waxed paper; plastic sheets; etc.

The adhesives, of course, are suitable for general application as, for example, for sealing bags in which food, etc., might be wrapped, and they are adapted for use either on packaging machinery or for application by hand.

What I claim is:

1. A nondrying adhesive which comprises (1) about 33⅓ to 75 parts of a sticky, stretchable polyester of a dihydric alcohol with a dimer of a fatty acid which contains at least two double bonds with (2) about 66⅔ to 25 parts of resinous cyclized rubber.

2. A nondrying adhesive which comprises about 70 to 50 parts of a cyclized rubber and about 30 to 50 parts of a sticky, stretchable polyester of a dihydric alcohol with a dimer of a fatty acid which contains at least two double bonds.

CLARENCE M. CARSON.

REFERENCES CITED

The following references are of record in the file of this patent:

UNITED STATES PATENTS

| Number | Name | Date |
|---|---|---|
| 2,102,716 | Berch | Dec. 21, 1937 |
| 2,188,332 | Carothers | Jan. 30, 1940 |
| 2,373,015 | Cowan et al. | Apr. 3, 1945 |
| 2,384,443 | Cowan et al. | Sept. 11, 1945 |

OTHER REFERENCES

"Oil and Soap Journal" of April 1944, pages 101 and 107, inclusive.